May 11, 1965     T. S. GATES     3,182,558
GEAR FINISHING EQUIPMENT
Original Filed May 11, 1959     6 Sheets-Sheet 1

FIG.1.

INVENTOR.
THOMAS S GATES
BY
ATTORNEYS

INVENTOR.
THOMAS S. GATES
ATTORNEYS

May 11, 1965 T. S. GATES 3,182,558
GEAR FINISHING EQUIPMENT
Original Filed May 11, 1959 6 Sheets-Sheet 3

INVENTOR.
THOMAS S. GATES
BY
ATTORNEYS

May 11, 1965     T. S. GATES     3,182,558
GEAR FINISHING EQUIPMENT
Original Filed May 11, 1959     6 Sheets-Sheet 6

INVENTOR.
THOMAS S. GATES
BY
ATTORNEYS

United States Patent Office 3,182,558
Patented May 11, 1965

3,182,558
GEAR FINISHING EQUIPMENT
Thomas S. Gates, Grosse Pointe Woods, Mich., assignor to National Broach & Machine Company, Detroit, Mich., a corporation of Michigan
Continuation of abandoned application Ser. No. 812,529, May 11, 1959. This application Mar. 9, 1964, Ser. No. 350,944
14 Claims. (Cl. 90—1.6)

The present invention relates to gear finishing equipment.

The present application is a continuation of my prior copending application Serial No. 812,529, filed May 11, 1959, now abandoned.

It is an object of the present invention to provide gear finishing equipment including a gear finishing machine, means for gauging gears finished by the machine and separating the gears into different categories, in accordance with the characteristics thereof, and means responsive to production by the machine of a predetermined number of gears exhibiting the same defect connected to the machine for effecting a correcting adjustment of the machine.

More specifically, it is an object of the present invention to provide a gear finishing machine, gauge means associated with the machine for checking finished gears for size, and means responsive to checking a predetermined number of gears exhibiting the same size defect operatively connected to the machine and effective to make a corrective adjustment thereof.

It is a further object of the present invention to provide gear finishing equipment including a machine for finishing gears, and means responsive to a predetermined defect in the finished gears for applying a corrective adjustment to the machine.

Other objects and features of the invention will become apparent as the description proceeds, especially when taken in conjunction with the accompanying drawings, illustrating preferred embodiments of the invention, wherein.

Described in general terms, the gear finishing equipment comprises a gear finishing machine such for example as the gear shaving machine adapted to finish a gear by rolling it in mesh with a gear-like shaving cutter while effecting a traverse in a plane parallel to the axis of both the gear and cutter to distribute the finishing action of the cutter longitudinally from end to end of the teeth of the gear. Alternatively, the operation may be a gear honing operation in which the gear-like tool is preferably a resin compound having abrasive particles embedded therein, in which case the work gear will normally have been heat treated before the final honing operation.

The present invention is intended to facilitate incorporation into automated lines of the appropriate equipment so that a succession of work gears may be finished to accurate dimensions and gauged without requiring the attention of an operator.

The gauging apparatus as will subsequently be described in detail, is adapted to check several gear characteristics, specifically as disclosed herein, size and helix angle. The gauging apparatus includes means for separating gauged gears into three categories; namely, acceptable gears, salvageable gears, and unsalvageable gears. In addition, the gauging apparatus is in control of means on the gear finishing machine effective to adjust the machine to correct for an error observed in a predetermined number of gears. For example, the equipment may be designed to effect automatic changes in the setting of the gear finishing machine to correct size errors of the gears, and may be arranged to effect an appropriate adjustment whenever a predetermined number of successive gears exhibit the same disqualifying deflects.

The gear gauging apparatus disclosed in the several figures is intended to gauge a series of gears as finished by a gear finishing operation, such for example as a gear shaving operation. In a typical setup an automatic gear shaving machine is arranged to discharge finished gears onto a chute or trackway which advances the gears to the gear gauging apparatus. In order to control the sequence of gauging in an orderly manner, a suitable gate may be provided which admits the gears one at a time to the gauging apparatus. This gate may conveniently be under the control of a solenoid actuated by exit from the gauging apparatus of the gear previously gauged. Since the gauge is or may be intended to shut down the shaving machine, it is desirable that gears be gauged substantially as they are finished by the shaving machine.

The gauging apparatus comprises a pair of master gears 10 and 12, the gear 10 being mounted on a shaft 14 journaled in bearings 16 and 18 received in bosses 20 and 22 respectively of side plates 24 and 26. Connected to the shaft 14 by a flexible coupling indicated at 28 is motor means indicated generally at 30 adapted to drive the master gear 10 in continuous slow rotation.

Figure 6:
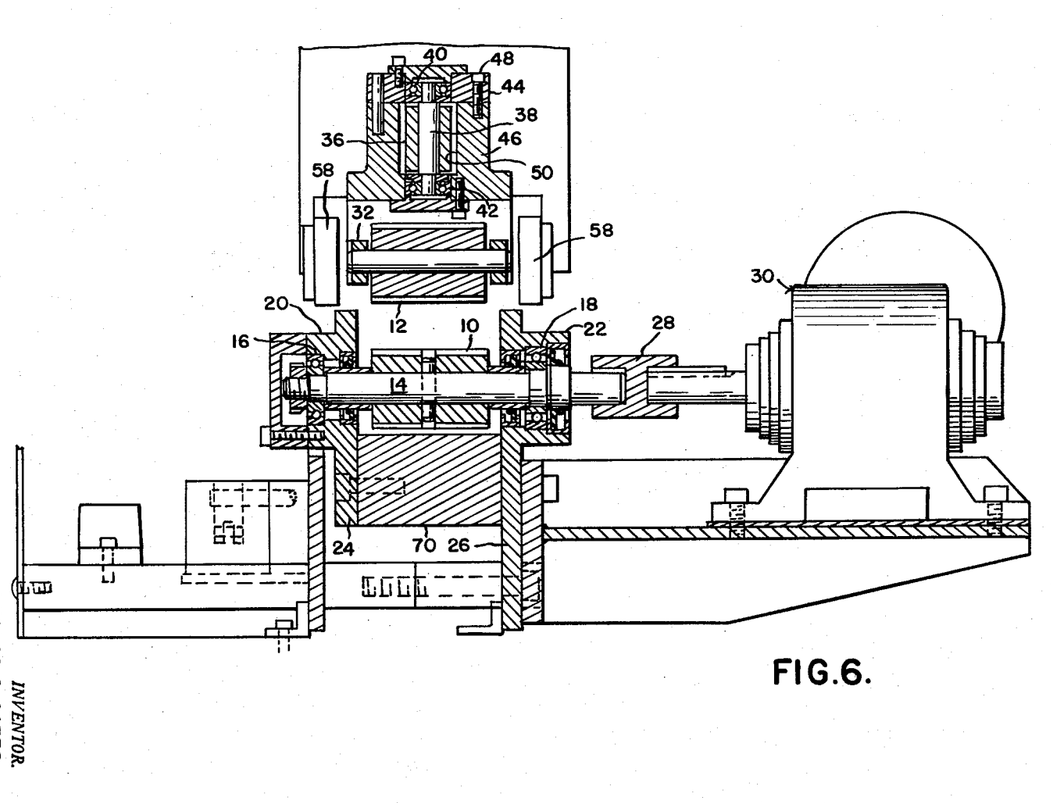
FIGURE 6 is a fragmentary sectional view on the line 6—6, FIGURE 1.

The master gear 12 is located adjacent to the master gear 10 with its axis generally parallel thereto, thereby providing a space between the master gears 10 and 12 through which a series of gears to be checked or gauged are passed. The master gear 12 is journaled between arms 32 at the end of a gooseneck 34 provided on a relatively long measuring or gauging arm 36 which preferably is formed of a cast light metal such for example as aluminum or magnesium. The purpose of providing the long arm 36 is to magnify or amplify movements of the master gear 12 resulting from checking or gauging of work gears. The arm 36 is journaled for angular adjustment about the axis of a pivot shaft 38 as best seen in FIGURE 6. The ends of the pivot shaft 38 are received in bearings indicated generally at 40 and 42, the former being contained in a cap 44 secured to a bracket 46 by suitable means such as the screws indicated at 48, and the latter being received at the lower end of a stepped bored passage 50 in the bracket.

The bracket 46 in turn includes a sleeve portion 52 carrying a pivot pin 54 the ends of which are received in bearing 56 which in turn are mounted in openings in ears 58 of a fixed mounting bracket 60.

It will be observed that the axis of the pivot shaft 38 is perpendicular to and intersects the axes of the master gears 10 and 12 when the master gear 12 is in an intermediate position. It will further be observed that the axis of the pivot pin 54 is generally parallel to the axes of the master gears 10 and 12 and is located such that as the bracket 46 rocks about the axis of the pivot pin 54, the master gear 12 moves generally toward and away from the master gear 10. Extending through a partially tapped opening 62 in the gooseneck 34 of the arm 36 is a screw 64 associated with a soft plug in advance of the screw which is forced by the screw against the periphery of the master gear 12 to prevent rotation thereof. By loosening the screw, the master gear 12 may be rotated from time to time to new positions to compensate for any wear.

The gears to be checked are led to the gear gauging apparatus along a suitable chute or trackway, a portion of which is indicated at 66, whence the gears pass to a surface 68 formed in a block 70 received between the side plates 24 and 26, as best illustrated in FIGURE 6, the surface being inclined so that the gears advance into contact with the rotating master gear 10. It will be recalled that gears are advanced singly to the apparatus. As the gear to be gauged engages the master gear 10, it may or may not at the first instant become meshed therewith and a plate 72 having a nose portion 74 is provided which prevents the gear being gauged from contacting the upper master gear 12 until it has become fully meshed with the lower rotating master gear 10.

As the gear to be gauged passes through the space between the master gears 10 and 12, the teeth of the master gear 12 will enter into the spaces in the gear being gauged and will swing the arm 36 about the axis of the pivot pin or shaft 38 to a point determined by the actual helix angle of the teeth on the gear being gauged. At the same time as the gear being gauged passes through the space between the master gears, the master gear 12 will be moved about the axis of the pivot pin 54 to a position determined by the size or pitch diameter of the gear being gauged.

Figure 1:
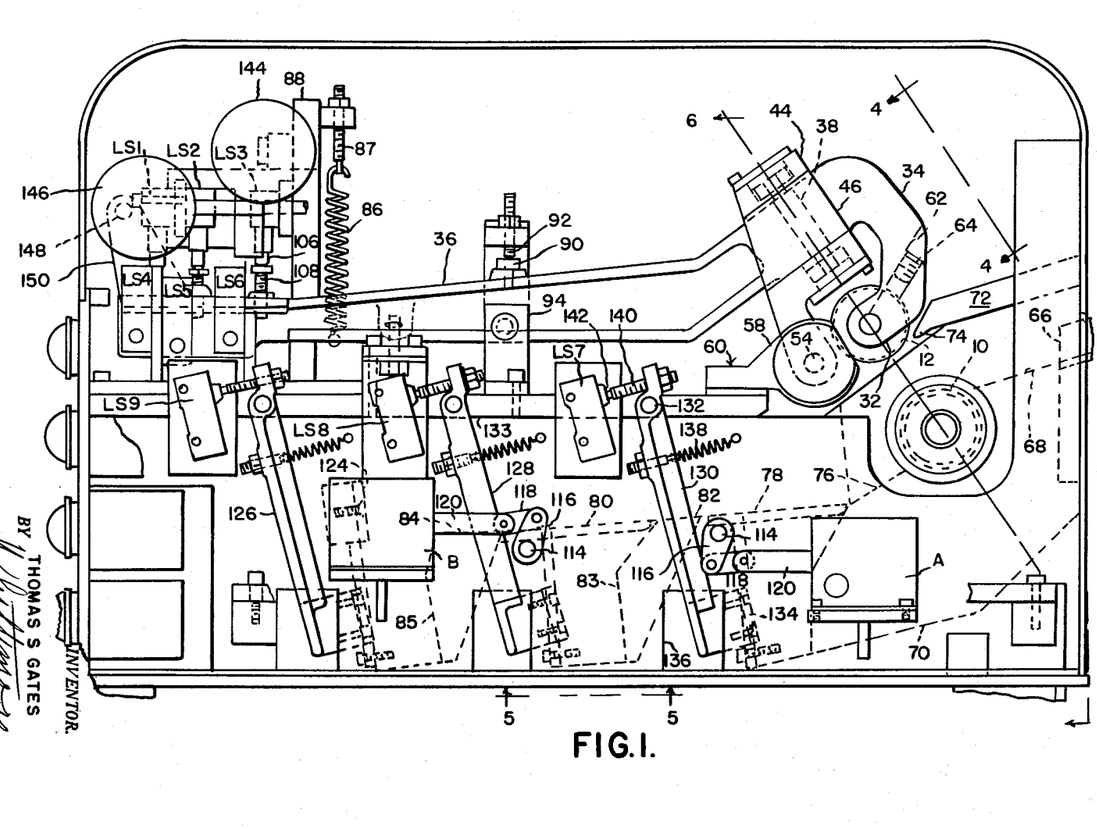
FIGURE 1 is a side elevational view of gear gauging apparatus associated with the gear finishing machine, shown with the cover plate removed.

After the gear being gauged has passed through the space between the master gears it drops to surface 76 of the block 70 and thence rolls downwardly and to the left, as seen in FIGURE 1, over trap doors 78 and 80, and thence drops off the trackway formed by the surface 76, the trap door 78, the surface 82 of a block 83, the trap door 80, and the surface 84 of a block 85 to a conveyor or receptacle for receiving gears within acceptable limits as to size and helix angle. As will subsequently be described, either of the trap doors 78 or 80 may be projected to an open position in which they block passage of the gauged gear and cause it to drop down to a conveyor or receptacle for the reception of rejected gears.

The arm 36 has connected thereto a tension spring 86 the upper end of which is connected to an adjustable screw 87 carried by a pivot 88. The spring 86 biases the arm 36 clockwise as seen in FIGURE 1, to a position in which an abutment 90 thereon engages an adjustable abutment screw 92 carried by a post 94. Adjustment of the screw 92 predetermines the position of the master gear 12 prior to engagement therewith of a gear being gauged. This adjustment is normally such that passage of even an abnormally undersize gear will result in counterclockwise rocking movement of the arm 36 as seen in FIGURE 1.

Similarly, the arm 36 has connected therewith a second spring 96 carried by an adjustable screw 98 secured to the arm 36. The spring 96 is adapted to bias the arm 36 to bring about contact between an abutment 100 on the arm and an adjustable abutment screw 102 on a post 104. Adjustment of the screw 102 is such that passage of a gear with a left hand helix angle error will move the arm 36 a predetermined distance, passage of a gear of correct helix angle will move the arm 36 a further distance, and passage of a gear with right hand helix angle error will move the arm 36 even further in the same direction about the axis of the pivot pin 38.

The spring 86 is somewhat stronger than the spring 96 so as to insure that errors of helix angle will appear as such and not appear as errors in size as might otherwise occur. It will be understood that with off-helix condition and without the provision for yielding movement about the axis of the pivot pin or shaft 38, full meshing between the gear being gauged and the master gear 12 would be prevented and this would appear as an error in size. With the spring 86 however, sufficiently stronger than the spring 96, full meshing of the teeth is caused irrespective of what errors exist so that any existing error in helix angle will result in the correct lateral displacement of the arm 36.

It follows from the foregoing that in order to obtain a true sensing of the actual size of the gear being gauged, it is necessary to mount the master gear 12 so that it may swing about an axis perpendicular to and intersecting the axes of the master gear 12, the work gear, and the master gear 10 when the axes of these gears are all in substantial alignment. The gear being gauged will adjust itself to the helix angle of the master gear 10 and will move into full depth with respect thereto. The master gear 12 will in turn adjust itself to the angularity of the teeth being gauged by swinging about the axis of the pin 38 and will thus move into mesh at full depth therewith, thus affording a true indication or measurement of size or pitch diameter of the gear being gauged. As disclosed herein, the swinging movement of the arm 36 about the axis of the pin 38 may be employed to provide an indication of helix angle error. It will be appreciated of course that the control means responsive to swinging movement of the arm 36 about the axis of the pin 38 may be adjusted to be sensitive to greater or lesser helix angle error as required by the particular gauging operation being performed. In a proper case the control means responsive to helix angle error may be set with such an extreme tolerance that in effect gears will not be rejected for helix angle error. In this case the angular movement of the arm 36 about the axis of the pin 38 may be considered as provided for the sole purpose of permitting full meshing engagement between the master gears and the gear being gauged so as to obtain a true indication of gear size without reference to helix angle error.

Associated with the arm 36 and cooperating therewith to sense or measure size of the gear being gauged are condition limit switches LS1, LS2, and LS3, these switches having plungers indicated generally at 106 actuated by adjustable screws 108 on the arm 36. Also associated with the arm 36 for measuring errors in helix angle are condition limit switches LS4, LS5, and LS6 which include plungers indicated generally at 110 actuated by adjustable abutment screws 112 carried by the arm 36.

Means are provided for actuating the trap doors 78 and 80 and these means comprise solenoids A and B respectively. The trap doors 78 and 80 are carried by pivot pins 114 having cranks 116 connected thereto, the cranks being connected by links 118 with the plungers 120 of the solenoids A and B. The arrangement is such that when the solenoids A or B are energized, the trap doors 78 or 80 are swung upwardly about the axis of the pivot mountings 114, leaving openings through which the gauged gears may be descended and also forming barriers to further passage of the gears along the trackway of which the trap doors are a part.

The trap doors 78 and 80 each cover an escape exit for gauged gears and gears which pass the trap doors 78 and 80 roll off the end of the surface 82 as previously described. An abutment plate 124 is provided to limit movement of gears and to cause them to fall directly downwardly off the end of the surface 82. In order to provide means which sense the movement of a gear downwardly through the space vacated by the trap door 78, the trap door 80, or through the space at the end of the trackway, identical means are provided, only one of which will be described in detail. These means comprise levers 126, 128 and 130 which are mounted for rocking movement about pivot pins 132 carried by a horizontal support plate 133 and which include angularly bent portions indicated generally at 134 at the bottom thereof extending through openings 136 into the path of movement of the gears. Spring means 138 are provided which bias the levers 130 into a position in which adjustable screws 140 engage plungers 142 of position limit switches LS7, LS8 and LS9 which are actuated by the levers 130, 128 and 126 respectively.

In general, the arrangement is such that as a gear passes between the master gears 10 and 12 the arm 36 is swung so as to actuate one or more of the condition limit switches LS1, LS2 and LS3 and to actuate one or more of the condition limit switches LS4, LS5 and LS6. Dependent upon which of these limit switches have been actuated, one of the trap doors 78 or 80 may be raised or both may remain closed. If the trap door 78 is elevated the gauged gear drops through the opening normally covered by the trap door 78 and trips the lever 130 thereby actuating position limit switch LS7. If the trap door 80 has been raised a gear drops through the space vacated by this trap door and engages the lever 128 thereby actuating position limit switch LS8. If neither of the trap doors have been elevated the gear rolls off the end of the trackway and trips the lever 126 thereby actuating position limit switch LS9. Actuation of position limit switches LS7, LS8 or LS9 signals the completion of a gauging operation and that the gauging apparatus is ready to receive a subsequent gear for gauging. As will subsequently be described in conjunction with the circuit, actuation of any one of these last mentioned limit switches also resets the device for gauging the succeeding gear.

Suitable indicating gauges 144 and 146 may be provided. The gauge 146 includes a plunger 148 adapted to be actuated by a fishtail 150 secured to the movable end of the arm 36. The indicating gauge 144 includes a plunger actuated by means on the arm 36 in line with the adjustable abutment screw 108. The indicators are used primarily for the purpose of setup.

Figure 2:
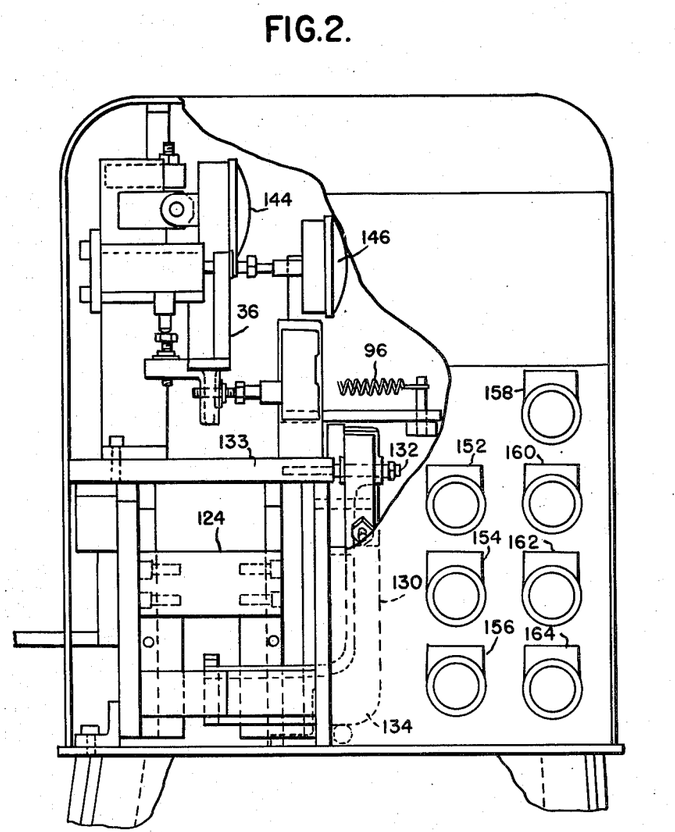
FIGURE 2 is an end view of the gear gauging apparatus as seen from the left in FIGURE 1.
Figures 3, 4, 5:
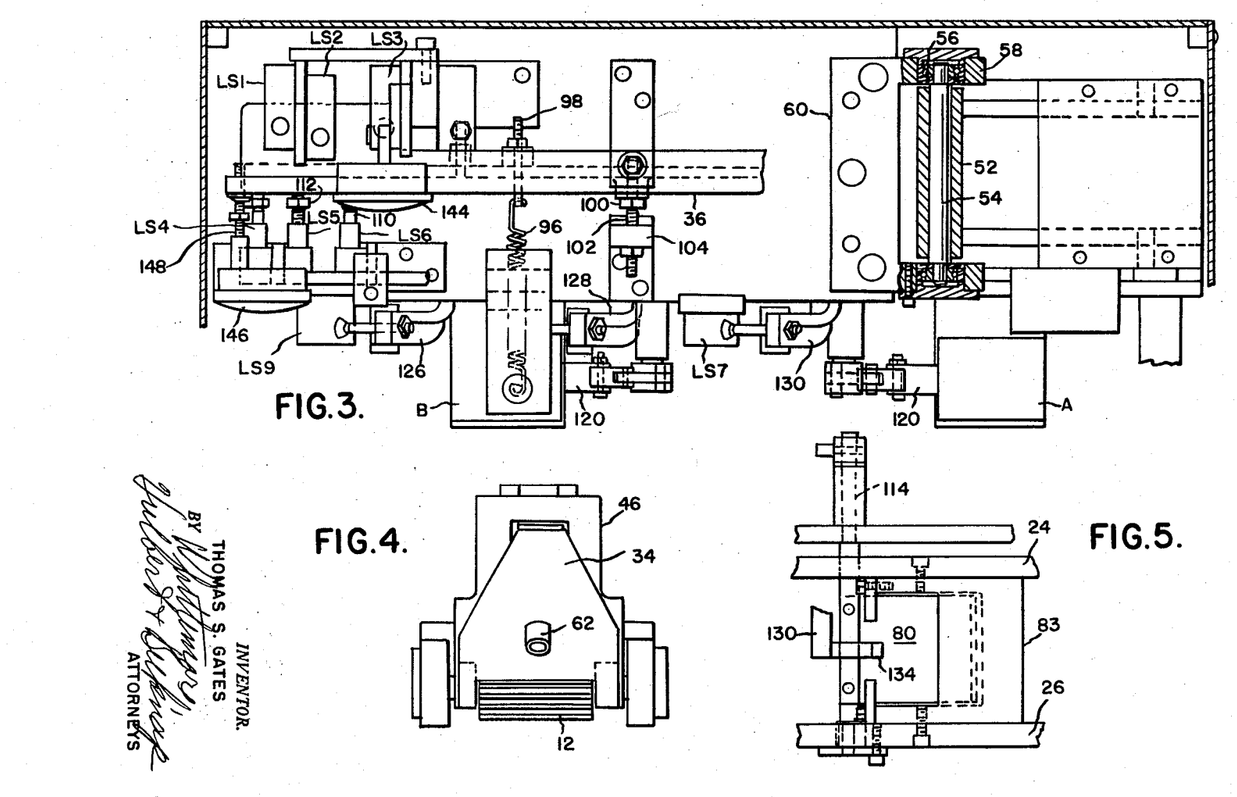
FIGURE 3 is a fragmentary plan view of the gear gauging apparatus with parts broken away.
FIGURE 4 is a fragmentary elevational view looking in the direction of the arrows 4—4, FIGURE 1.
FIGURE 5 is a fragmentary elevational view looking in the direction of the arrows 5—5, FIGURE 1.

Indicating lights are provided at the front of the gauging apparatus and as illustrated in FIGURE 2 may comprise a light 152 designated "Gauge On," a switch 154 designated "Start," a switch 156 designated "Stop," a light 158 designated "Oversize," a light 160 designated "Undersize," a light 162 designated "Off Helix Left," and a light 164 designated "Off Helix Right."

Figure 7:
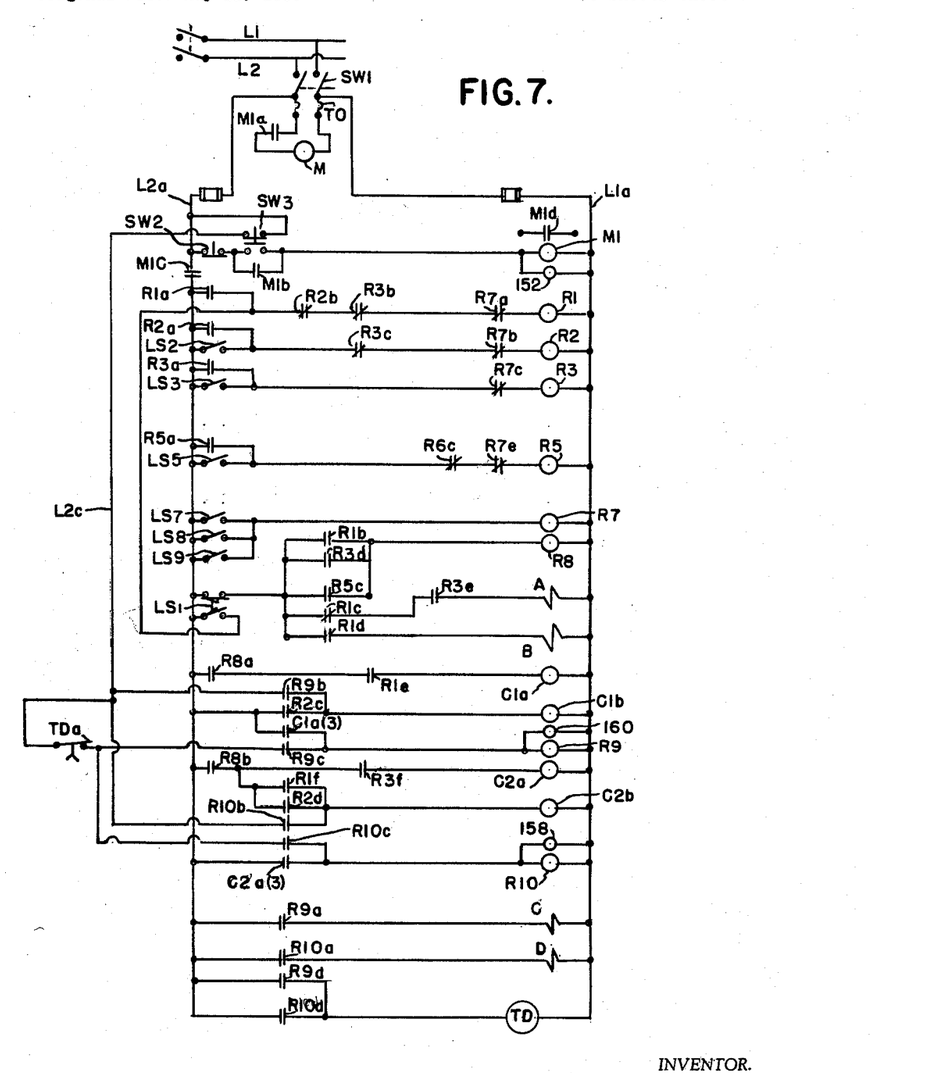
FIGURE 7 is a simplified wiring diagram of the circuit employed in the gear gauging apparatus with connections for effecting corrective adjustments to the machine.

Reference is now made to FIGURE 7 which is a wiring diagram showing that portion of the circuit which has the result of effecting adjustments of the gear finishing machine in accordance with errors noted in the size of the gears. It will be observed that not all of the limit switches previously referred to are incorporated in this circuit since FIGURE 7 is concerned only with so much of the system as results in automatic adjustment or resetting of the machine.

The circuit includes lines L1 and L2 connected through a switch SW1 to lines L1a and L2a respectively. Connected across the switch through thermal overload devices T0 is a motor M which corresponds to the motor 30 of the gauging equipment, controlled by contacts M1a of a master relay M1. Extending between lines L2a and L1a is a stop switch SW2, the contacts of a start-reset switch SW3, and the master relay M1. Normally open contacts M1b of relay M1 are connected around the start contacts of switch SW2 and signal light 152 is connected in parallel with the master relay M1.

The normally open contacts shown directly above the master relay M1 and designated M1d are connected into the control circuit for the gear finishing or manufacturing machine so that operation of the machine is possible only when the gauging apparatus is in operation. In the illustrated embodiment of the invention automatic adjustment of the machine is limited to size adjustment. In this case it may be desirable to provide for automatic shut-down of the machine if another defect such for example as helix angle, is noted in a predetermined number of consecutive gears. In such case a normally closed contact may be provided in series with the master relay M1, to be opened when a predetermined number of gears are found to have unacceptable helix errors, and de-energization of the master relay M1 will terminate operation of the gear finishing machine and de-energize gauging equipment. However, the circuit shown in FIGURE 7 for simplicity, eliminates all portions having to do with helix angle error.

The gauging device is effective to gauge all of the gears finished by the gear finishing machine for size and helix angle and to interrupt automatic operation of the machine when a predetermined number of consecutive gears exhibit the same helix angle error. If a predetermined number of consecutive gears exhibit the same size error, an automatic adjustment of the machine is made as will subsequently be described.

When the start-reset switch SW3 is depressed into engagement with the lower pair of contacts a circuit is completed through the stop switch SW2 and the master relay M1. Energization of the relay M1 closes normally open contacts M1a, thus energizing the motor M and also closing normally open contacts M1b and M1c. Closure of contacts M1b establishes a holding circuit around the lower pair of contacts of the start-reset switch SW3, and closure of contacts M1c energizes the circuit to the various limit positions as will now be described.

It will be recalled that condition limit switches LS1, LS2 and LS3 are adapted to be actuated in sequence as a gear passes through the space between the master gears if the gear is oversize. An undersize gear actuates limit switch LS1. If the gear is of the required size limit switches LS1 and LS2 are actuated in sequence but limit switch LS3 is not actuated. Limit switch LS1 is provided with two sets of contacts and will move from the illustrated position to the lower position upon initial movement of the arm 36. This completes a circuit from line L2a to line L1a through normally closed relay contacts R2b, R3b, R7a, and relay R1. Energization of relay R1 closes normally open contacts R1a, thus establishing a holding circuit for the relay R1 independent of condition limit switch LS1. In addition, energization of the relay R1 also closes normally open contacts R1b, R1d, R1e, and R1f and opens normally closed contacts R1c.

Condition limit switch LS2 is connected between lines L2a and L1a in series with normally closed contacts R3c, R7b, and relay R2. Relay R2 when energized closes normally open contacts R2a which are connected around limit switch LS2 to establish a holding circuit for relay R2 independent of limit switch LS2. In addition, energization of relay R2 opens normally closed contacts R2b in series with relay R1 and thus when relay R2 is energized, relay R1 is de-energized. Also, normally open contacts R2c and R2d are provided in series respectively, with counter reset coils C1b and C2b.

Condition limit switch LS3 is also connected between lines L2a and L1a and is in series with normally closed contacts R7c of relay R7 and with relay R3. Energization of relay R3 closes normally open contacts R3a which are connected around limit switch LS3 to establish a holding circuit for the relay R3 independent of the limit switch LS3, and opens normally closed contacts R3b and R3c, thus breaking the circuits to relays R1 and R2. Normally open contacts R3d and R3e are also closed by energization of relay R3.

With the three branch circuits including relays R1, R2 and R3, it will be observed that initial movement of the arm 36 reverses condition limit switch LS1 from the position shown and will energize relay R1. Further movement of the arm 36 closes condition switch LS2 which will de-energize relay R1. Still further movement of the arm 36 will operate condition limit switch LS3 to energize relay R3 which in turn will de-energize relay R2. Accordingly, if an undersize gear passes between the master gears 10 and 12, the relay R1 becomes and remains energized. If a normal size gear passes between the master gears relay R2 becomes and remains energized, and relays R1 and R3 are not energized at this time. If an oversize gear passes between the master gears relay R3 becomes and remains energized and relays R1 and R2 are de-energized. From this standpoint it will be appreciated that condition limit switches LS1, LS2 and LS3 cooperate to control the gauging apparatus in accordance with the size of the gear, limit switch LS1 having the additional function of delaying operation of the solenoids and counting mechanism later to be described, until the gear being gauged has passed the master gears.

Position limit switches LS7, LS8, and LS9 are connected in parallel between the lines L2a and L1a and are in series with the relay R7. As a result of this a gear actuating any of the levers 126, 128 or 130 on its exit from the gauging apparatus will energize relay R7, thus opening the normally closed contacts R7a, R7b, R7c, R7e, thus opening whichever of the relays R1, R2, R3, or R5 which remains energized at this time.

It will be observed that the upper pair of contacts of condition limit switch LS1, which are closed after the gear being gauged has passed between the master gears 10 and 12, connects to a group of normally open contacts R1b, R3d, and R5c, disposed in parallel between the upper contacts of limit switch LS1 and a relay R8. The relay R8 when energized closes normally open contacts R8a and R8b which respectively control counting circuits later to be described. In addition, two parallel branch circuits to the solenoids A and B are connected in series with the upper contacts of limit switch LS1. Solenoid A has in series therewith normally closed contacts R1c and R3e. The solenoid B has in series therewith normally open contacts R1d. It will be observed that when relay R1 remains energized, which will indicate passage of an undersize gear, normally open contacts R1d will be closed to complete a circuit to the solenoid B when condition limit switch LS1 returns to its upper position, as it will do upon passage of the gauged gear through and beyond the master gears 10 and 12. Energization of the solenoid B opens trap door 80 and permits the undersize gear to fall into a convenient receptacle or conveyor. Since this gear is already undersize it cannot be salvaged by further operations. If however, relay R1 has been opened due to the fact that the gear passing through the gauge is of either proper size or oversize, then normally closed contacts R1c remain closed and a circuit is completed to the solenoid A through normally open contacts R3e. Contacts R3e will be closed if the gear is oversize. Accordingly, if the gear is oversize solenoid A is energized and trap door 78 is raised and the gear drops into a suitable receptacle or conveyor. Since the gear is oversize, it may be salvaged.

If the only relays remaining energized after passage of a gear therethrough are the relays R2 and R5, neither of the solenoids A or B is energized and the gear which is of correct size passes completely across the supporting surface and actuates lever 126 on its downward passage from the machine. Passage of the gear from the machine in any case will operate relay R7 and hence will clear all of the relays R1, R2, R3 and R5 which remain energized at that time.

If the gear being gauged is oversize or undersize this error is used to energize counting devices which are connected in the circuit. Counting devices of this type are well known and include windings which are periodically energized and adapted upon each energization to shift a contact element one step. After a predetermined number of steps the contact element is adapted to complete an external circuit. The counting devices also include reset windings which when energized serve to clear the accumulated count in the device and return the movable contact to initial position. Conveniently, the counting device may be set to complete the external control circuit after a count of three, which is the condition illustrated in the present circuit. Counting devices of this type are available from the Guardian Electric Company of Chicago, and are identfied as Guardian series stepping relays, series M.E.R.

The counting devices are two in number, the first being adapted to count undersize gears and including an actuating winding C1a and a reset winding C1b. In series with the counting windings C1a are normally open contacts R8a which are closed when a gear is rejected for any cause, and normally open contacts R1e which are closed if the gear is rejected as undersize. The contacts designated C1a(3) are the contacts which are adapted to be closed after the coil C1a has been energized a predetermined number of times as for example the three times referred to in the present case. It will be observed that closure of contacts C1a(3) establishes a circuit to relay R9 and to signal light 160. Energization of relay R9 in turn closes normally open contacts R9a in series with a valve actuating solenoid C whose function is to effect an adjustment of the gear finishing machine as will subsequently be described. In addition, energization of relay R9 closes normally open contacts R9d, thus completing a circuit to a time delay relay TD which after a predetermined interval will open time delay contacts TDa.

Energization of relay R9 after three consecutive undersize gears have passed through the apparatus also closes normally open contacts R9b which connect line L2c to the reset coil C1b, thus resetting the counting device to zero. Normally open contacts R2c are in series with the reset coil C1b, thus if a gear of proper size or oversize follows an undersize gear energization of relay R2 will complete a circuit through contacts R2c to the reset coil and set the counter back to zero. Thus, a size adjustment is made only after three consecutive undersize gears have passed through the gauging apparatus.

Energization of relay R9 also closes normally open contacts R9c, thus establishing a circuit through the relay R9 independent of contacts C1a(3) to the reset line L2c through the time delay contacts TDa. This retains relay R9 and signal light 160 energized after operation of the gauging apparatus.

In the assumed case the three consecutive gears which resulted in actuation of the relay R were undersize. It is assumed that conceivably a properly operating gear finishing machine may act upon a roughed-out gear having such characteristics that in a single shaving operation these defects may not be fully overcome so that the presence of a single gear in the gauging apparatus which exhibits one or more defects is not a true indication of an error in the operation of the gear finishing machine which requires adjustment or resetting. However, if three consecutive gears through the gauging apparatus exhibit the same error it is almost a certainty that the difficulty is due to an error which has come about as a result of faulty setting or adjustment, or wear of the gear finishing machine. This condition may occasionally be brought about after continued operation as a result of grinder change, to cite one possible condition.

The counting and control mechanism for oversize gears is similar to that for undersize gears and the same system of reference numerals is applied thereto. Thus, the counter for oversize gears includes the counting coil C2a and its reset coil C2b. In series with the counting coil C2a are normally open contacts R8b and R3f. Reset coil C2b is in series with normally open contacts R8b and includes in series therewith parallel normally open contacts R1f and R2d. A branch line connects the reset coil C2b through normally open contacts R10b to the reset line L2c. Relay R10 is in parallel with signal light 158 and these together are in series with normally open contacts C2a(3). A branch line containing normally open contacts R10c connects relay R10 to the reset line L2c through the contacts TDa.

Relay R10 is energized when contacts C2a(3) are closed as a result of three consecutive oversize gears passing through the gauging apparatus. Energization of relay R10 closes normally open contacts R10a and R10d. Closure of contacts R10a energizes solenoid D of a valve controlling admission of fluid to machine adjusting mechanism as will subsequently be described. Relay R10 is de-energized after a measured interval by opening of the contacts TDa.

Referring now more particularly to the operation of the solenoids C and D, it is to be observed that passage of three consecutive undersize gears will close normally open relay contacts R9a and R9d. Closing of contacts R9a places solenoid C in circuit across lines L1a and L2a. Relay R9d completes a circuit to the time delay relay TD. After a time determined by the setting of the time delay relay TD, during which time the solenoid C remains energized, contacts TDa open breaking the circuit to relay R9 and opening normally open contacts R9b, R9c, R9a, and R9d. Opening of contacts R9d de-energizes the time delay relay TD to cause the contacts TDa to assume normally closed position. The cycle is then ready to be repeated with successive automatic adjustments of the machine without the necessity of shutting down either the machine or the gauging apparatus.

When a gear enters the gauge master gears 10 and 12, its size and helix angle are transmitted to the condition limit switches by the arm 36. Limit switches LS1, LS2 and LS3 indicate undersize, good size, and oversize in that order. Limit switches LS4, LS5 and LS6 indicate off-helix angle left, good helix angle, and off-helix angle right in that order. With no gear between the master gears the lever arm 36 is spring loaded to rest below the undersize range and to the left of the off-helix angle left range. An oversize gear with off-helix angle right error will actuate all condition limit switches to reach its final signal. All counting and trap door action is delayed by the back or upper contacts of limit switch LS1 until limit switch LS1 returns to its illustrated position after actuation by a gear.

Any gear passing through the gauge that does not contain any of the previous errors counted will reset those circuits to zero and count its own errors, if any.

The undersize chute or conveyor will accept all undersize gears regardless of helix condition. The oversize chute or conveyor will accept oversize gears with a helix angle error and good gears with helix angle error. The only gears that will enter the good chute or conveyor are correct both as to size and helix angle.

When a gear falls through any of the three chutes a limit switch is tripped, which will de-energize all condition relays R1, R2, R3 and R5, and close any open chute doors in preparation for the next gear.

Figure 8:
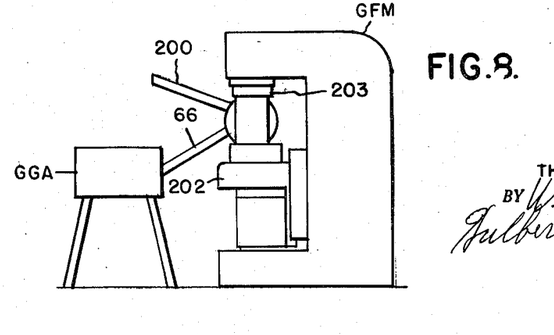
FIGURE 8 is a diagrammatic view illustrating the association of the gauging apparatus to receive the output of the gear finishing machine directly.

In FIGURE 8 there is illustrated the combination of a fully automatic gear finishing machine GFM having a chute 200 over which gears are advanced to the machine. The machine may be of the type illustrated in my prior Patent 2,692,536 and is adapted to operate in a fully automatic manner to load gears into the machine, carry out a gear finishing operation, and discharge gears from the machine. The finished gears discharged from the machine advance over a chute 66 connecting the gear finishing machine to the gear gauging apparatus designated generally as GGA. The machine comprises a work support 202 adjustable vertically toward and away from a cutter head 203 to control size of shaved gears.

The gear finishing machine is intended for fully automatic operation, so that it does not require the attention of an operator. It is essential, in order to avoid the possibility of producing a large number of inaccurate gears, which may even be scrap gears, that means be provided which will supervise the production from the machine. The automatic gauging apparatus GGA accomplishes this purpose. It gauges each gear as it is discharged from the gear finishing machine and when a predetermined number, as for example three, of the finished gears exhibit the same disqualifying deviation either singly or in combination with other errors from required gear characteristics, the gear gauging apparatus automatically effects an adjustment of the machine to correct the errors which disqualified the gears.

Figures 9, 10:
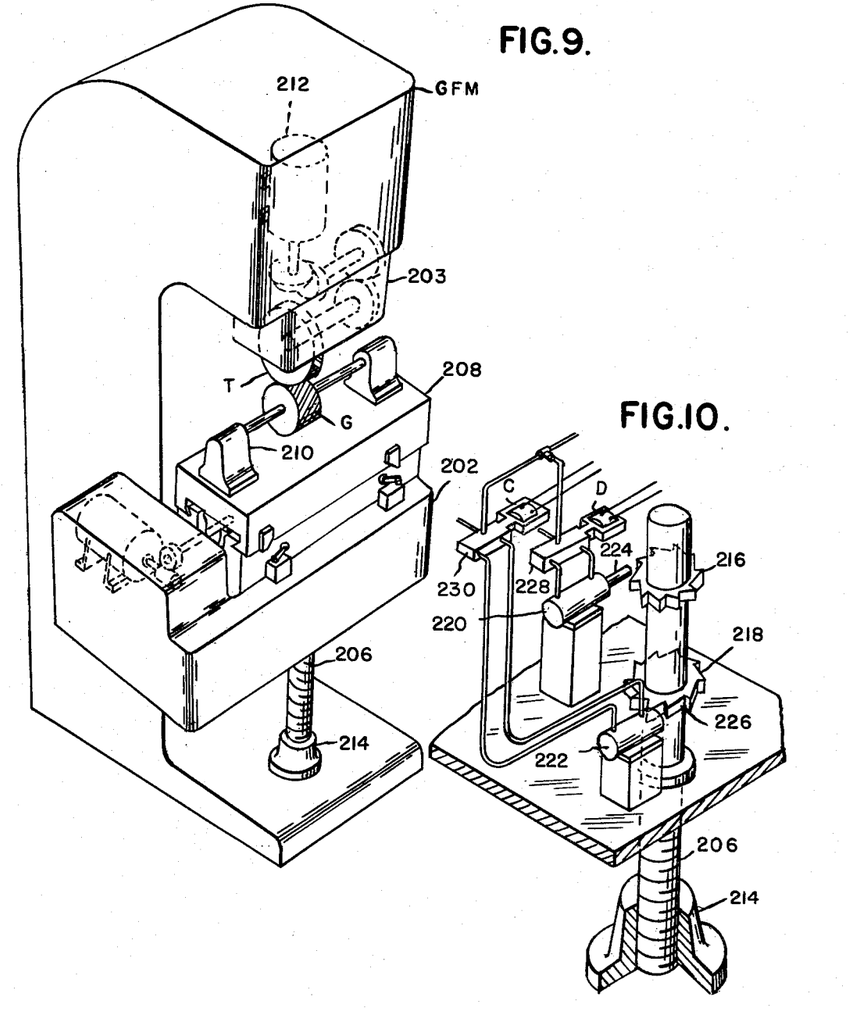
FIGURE 9 is a perspective view of the gear finishing machine.
FIGURE 10 is a fragmentary perspective view showing the mechanism for effecting corrective adjustment of the machine under the control of the gear gauging apparatus.

Referring now to FIGURES 9 and 10 the gear finishing machine GFM is shown in more detail. In this figure the work support 202 is seen to be adjustable vertically by means of a screw 206. The work supporting structure is seen to include a slide 208 having stocks 210 supporting a work gear G for finishing operation. The gear G is in mesh with the tool T driven in rotation through suitable gearing by a motor 212.

Referring now more specifically to FIGURE 10 the vertical screw 206 is shown as associated with a stationary nut 214 and having adjacent its upper ends oppositely facing ratchet wheels 216 and 218. Fluid actuated piston and cylinder devices 220 and 222 are provided including pistons 224 and 226 engageable with teeth of the ratchets 216, 218. The pistons may be urged inwardly of the cylinders by springs (not shown) or the cylinders may be connected for two-way hydraulic or pneumatic actuation. In any case, the cylinders 220 and 222 are connected by fluid pressure lines to valves 228 and 230 respectively, the valve 228 is actuated by solenoid D, and the valve 230 is actuated by the solenoid C. The arrangement is such that when the solenoid C or D is energized fluid under pressure is admitted to the corresponding cylinder and the piston moves outwardly to effect rotation of the screw shaft 206. Pistons 224 and 226 are laterally flexible so that as they complete their stroke the next succeeding tooth flexes the piston laterally by a small amount. Thus, when the piston is returned and is permitted to resume a straight condition, its end will be in alignment with a portion of the face of the next succeeding tooth.

It will be observed that repeated adjustment in the same or opposite directions may be effected as required. It is further apparent that the size adjustment may be carried out without interrupting automatic cycling of the machine.

The drawings and the foregoing specification constitute a description of the improved gear finishing equipment in such full, clear, concise and exact terms as to enable any person skilled in the art to practice the invention, the scope of which is indicated by the appended claims.

What I claim as my invention is:

1. An automatic gear finishing machine for finishing work gears to specified dimensions, gauge means for checking the dimensions of each gear as it is finished, and automatic means for adjusting the machine in opposite directions responsive to said gauge means to adjust the machine in a direction to eliminate from successive gears the errors in either direction from the specified dimensions noted in finished work gears.

2. An automatic gear finishing machine for finishing work gears to specified dimensions, gauge means for checking the dimensions of each gear as it is finished, and automatic means for adjusting the machine in opposite directions responsive to discovery of like errors in either direction from the specified dimensions in a predetermined number of consecutive gears to adjust the machine in a direction to eliminate from successive gears the like errors noted in finished work gears.

3. An automatic gear finishing machine for finishing work gears to specified dimensions, gauge means for checking the dimensions of each gear as it is finished, means controlled by said gauge for separating gears having disqualifying errors from satisfactory gears, and means for adjusting the machine in opposite directions responsive to separation of a predetermined number of consecutive gears for the same error in either direction from the specified dimensions operable automatically to adjust the machine in a direction to eliminate such error on succeeding gears.

4. An automatic gear finishing machine for finishing work gears to specified dimensions, a gear gauging and separating apparatus comprising gauge means for checking the dimensions of each gear as it is finished, means controlled by said gauge for separating gears having disqualifying errors from satisfactory gears, and means connected to said apparatus responsive to separation of a predetermined number of consecutive gears for the same error operable automatically to adjust the machine to eliminate such error on succeeding gears, the means for adjusting the machine comprising a pair of motor means mounted on said machine for effecting opposite machine adjustments, and solenoids operatively connected to said gauge means and connected to and in control of said motor means.

5. An automatic gear finishing machine for finishing work gears to specified dimensions, a gear gauging and separating apparatus comprising gauge means for checking the dimensions of each gear as it is finished, means controlled by said gauge for separating gears having disqualifying errors from satisfactory gears, and means for adjusting the machine in opposite directions connected to said apparatus responsive to separation of a predetermined number of consecutive gears for the same error in either direction from the specified dimensions operable automatically to adjust the machine in a direction to eliminate such error on succeeding gears, the means for adjusting the machine comprising a pair of motor means mounted on said machine for effecting opposite machine adjustments, and solenoids operatively connected to said gauge means and connected to and in control of said motor means.

6. An automatic gear finishing machine for finishing work gears to specified dimensions, a gear gauging and separating apparatus comprising gauge means for checking the dimensions of each gear as it is finished, means controlled by said gauge for separating gears having disqualifying errors from satisfactory gears, and means connected to said apparatus responsive to separation of a predetermined number of consecutive gears for the same error operable automatically to adjust the machine to eliminate such error on succeeding gears, the means for adjusting the machine comprising a pair of fluid motor means mounted on said machine for effecting opposite machine adjustments, and solenoid valves operatively connected to and in control of said motor means.

7. An automatic gear finishing machine for finishing work gears to specified dimensions, a gear gauging and separating apparatus comprising gauge means for checking the dimensions of each gear as it is finished, means controlled by said gauge for separating gears having disqualifying errors from satisfactory gears, and means for adjusting the machine in opposite directions connected to said apparatus responsive to separation of a predetermined number of consecutive gears for the same error in either direction from the specified dimensions operable automatically to adjust the machine in a direction to eliminate such error on succeeding gears, the means for adjusting the machine comprising a pair of fluid motor means mounted on said machine for effecting opposite machine adjustments, and solenoid valves operatively connected to said gauge means and connected to and in control of said motor means.

8. An automatic gear finishing machine comprising a work support, a tool support, a rotatable threaded element connected to one of said supports to move it toward and away from the other support to change the size to which work gears are finished, a gauge positioned to receive each work gear as it is finished by said machine, means actuated by said gauge to separate acceptable gears from oversize and undersize gears, and means for adjusting the threaded element in opposite directions actuated by said gauge to rotate said threaded element in a direction to eliminate a size error noted by said gauge.

9. An automatic gear finishing machine comprising a work support, a tool support, a rotatable threaded element connected to one of said supports to move it toward and away from the other support to change the size to which work gears are finished, a gauge positioned to receive each work gear as it is finished by said machine, means actuated by said gauge to separate acceptable gears from oversize and undersize gears, means for counting rejected gears, and means responsive to rejection of a predetermined number of consecutive gears as either undersize or oversize to effect an adjustment of said threaded element to eliminate the size error of following gears.

10. An automatic gear finishing machine comprising a work support, a tool support, a rotatable threaded element connected to one of said supports to move it toward and away from the other support to change the size to which work gears are finished, a gauge positioned to receive each work gear as it is finished by said machine, means actuated by said gauge to separate acceptable gears from oversize and undersize gears, means for counting rejected gears, and means for adjusting the threaded element in opposite directions responsive to rejection of a predetermined number of consecutive gears as either undersize or oversize to effect an adjustment of said threaded element in a direction to eliminate the size error of following gears.

11. An automatic gear finishing machine comprising a work support, a tool support, a rotatable threaded element connected to one of said supports to move it toward and away from the other support to change the size to which work gears are finished, a gauge positioned to receive each work gear as it is finished by said machine, means actuated by said gauge to separate acceptable gears from oversize and undersize gears, means for counting rejected gears, and means responsive to rejection of a predetermined number of consecutive gears as either undersize or oversize to effect a predetermined incremental adjustment of said threaded element to eliminate the size error of following gears.

12. An automatic gear finishing machine comprising a work support, a tool support, a rotatable threaded element connected to one of said supports to move it toward and away from the other support to change the size to which work gears are finished, a gauge positioned to receive each work gear as it is finished by said machine, means actuated by said gauge to separate acceptable gears from oversize and undersize gears, means for counting rejected gears, and means for adjusting the threaded element in opposite directions responsive to rejection of a predetermined number of consecutive gears as either undersize or oversize to effect a predetermined incremental adjustment of said threaded element in a direction to eliminate the size error of following gears.

13. An automatic gear finishing machine comprising a work support, a tool support, a rotatable threaded element connected to one of said supports to move it toward and away from the other support to change the size to which work gears are finished, a gauge positioned to receive each work gear as it is finished by said machine, means actuated by said gauge to separate acceptable gears from oversize and undersize gears, means for counting rejected gears, and means responsive to rejection of a predetermined number of consecutive gears as either undersize or oversize to effect a predetermined incremental adjustment of said threaded element to eliminate the size error of following gears, said last means comprising fluid actuated plungers and ratchet wheels associated with said plungers to said threaded element.

14. An automatic gear finishing machine comprising a work support, a tool support, a rotatable threaded element connected to one of said supports to move it toward and away from the other support to change the size to which work gears are finished, a gauge positioned to receive each work gear as it is finished by said machine, means actuated by said gauge to separate acceptable gears from oversize and undersize gears, means for counting rejected gears, and means for adjusting the threaded element in opposite directions responsive to rejection of a predetermined number of consecutive gears as either undersize or oversize to effect a predetermined incremental adjustment of said threaded element in a direction to eliminate the size error of following gears, said last means comprising fluid actuated plungers and ratchet wheels associated with said plungers fixed to said threaded element.

No references cited.

WILLIAM W. DYER, Jr., *Primary Examiner.*